US007769842B2

(12) United States Patent
Weber

(10) Patent No.: US 7,769,842 B2
(45) Date of Patent: Aug. 3, 2010

(54) STORAGE MANAGEMENT UNIT TO CONFIGURE ZONING, LUN MASKING, ACCESS CONTROLS, OR OTHER STORAGE AREA NETWORK PARAMETERS

(75) Inventor: Ralph O. Weber, Dallas, TX (US)

(73) Assignee: ENDL Texas, LLC, Dallas, TX (US)

( * ) Notice: Subject to any disclaimer, the term of this patent is extended or adjusted under 35 U.S.C. 154(b) by 869 days.

(21) Appl. No.: 11/463,163

(22) Filed: Aug. 8, 2006

(65) Prior Publication Data

US 2007/0033566 A1 Feb. 8, 2007

(51) Int. Cl.
G06F 15/177 (2006.01)
G06F 15/173 (2006.01)
(52) U.S. Cl. .................. 709/223; 709/220; 709/225
(58) Field of Classification Search .......... 340/506; 707/204; 711/202; 716/19; 717/120
See application file for complete search history.

(56) References Cited

U.S. PATENT DOCUMENTS

| 5,146,561 | A | 9/1992 | Carey et al. |
| 5,287,453 | A | 2/1994 | Roberts |
| 5,504,320 | A | 4/1996 | Adachi |
| 5,552,981 | A | 9/1996 | Yamada |
| 5,623,669 | A | 4/1997 | Kincaid |
| 5,826,015 | A | 10/1998 | Schmidt |
| 5,890,156 | A | 3/1999 | Rekieta et al. |
| 5,941,972 | A | 8/1999 | Hoese et al. |
| 5,991,771 | A | 11/1999 | Falls et al. |
| 6,029,231 | A | 2/2000 | Blumenau |
| 6,272,533 | B1 * | 8/2001 | Browne ............... 709/213 |
| 6,400,730 | B1 | 6/2002 | Latif et al. |
| 6,425,035 | B2 | 7/2002 | Hoese et al. |
| 6,765,919 | B1 | 7/2004 | Banks et al. |
| 7,051,182 | B2 * | 5/2006 | Blumenau et al. ........ 711/202 |
| 7,240,364 | B1 * | 7/2007 | Branscomb et al. ......... 726/9 |
| 7,313,579 | B2 * | 12/2007 | Murotani ............... 707/204 |
| 7,565,430 | B2 * | 7/2009 | Kortum et al. ........... 709/225 |
| 2002/0176434 | A1 | 11/2002 | Yu et al. |
| 2003/0018756 | A1 | 1/2003 | Nguyen et al. |
| 2003/0085914 | A1 | 5/2003 | Takaoka et al. |
| 2003/0179748 | A1 | 9/2003 | George et al. |
| 2003/0195956 | A1 | 10/2003 | Bramhall et al. |

(Continued)

OTHER PUBLICATIONS

Birtwistle, Fern, "Patentability Search, Method of Interfacing With and Protecting the Contents of a Data Storage Component," Alpha Patnets LLC, Feb. 22, 2006, 3 pages.

Primary Examiner—Aaron Strange
Assistant Examiner—Keyvan Emdadi
(74) Attorney, Agent, or Firm—Conley Rose P.C.

(57) ABSTRACT

Some of the embodiments disclosed are systems and methods of configuring an access masking structure which include, but are not limited to, selecting at least one computer to participate in an access restriction set, selecting at least one storage unit to participate in the access restriction set, disabling all non-selected computers, disabling all non-selected storage units and placing the access masking structure into learn mode. This method also comprises booting the computer, detecting activity between the selected computers and the selected storage units, and automatically building the access restriction set based upon the detected computers and storage units while the access masking structure is in the learn mode.

20 Claims, 12 Drawing Sheets

U.S. PATENT DOCUMENTS

| | | |
|---|---|---|
| 2004/0054866 A1* | 3/2004 | Blumenau et al. ........... 711/202 |
| 2004/0059909 A1 | 3/2004 | Le Pennec et al. |
| 2004/0218593 A1 | 11/2004 | Hammons et al. |
| 2004/0230838 A1 | 11/2004 | Cheron |
| 2004/0243852 A1 | 12/2004 | Rosenstein |
| 2004/0255157 A1 | 12/2004 | Ghanea-Hercock |
| 2005/0010804 A1 | 1/2005 | Bruening et al. |
| 2005/0018672 A1 | 1/2005 | Dropps et al. |
| 2005/0076121 A1 | 4/2005 | Kortum et al. |
| 2005/0076237 A1 | 4/2005 | Cohen et al. |
| 2005/0091353 A1 | 4/2005 | Gopisetty et al. |
| 2005/0169258 A1 | 8/2005 | Millet et al. |
| 2006/0026684 A1 | 2/2006 | Harvey et al. |
| 2006/0155865 A1* | 7/2006 | Brandt et al. ............... 709/230 |
| 2007/0006150 A9* | 1/2007 | Walmsley ................... 717/120 |
| 2007/0033566 A1* | 2/2007 | Weber ......................... 716/19 |
| 2007/0241876 A1* | 10/2007 | Johnston et al. ............. 340/506 |

* cited by examiner

STORAGE MANAGEMENT UNIT TO CONFIGURE ZONING, LUN MASKING, ACCESS CONTROLS, OR OTHER STORAGE AREA NETWORK PARAMETERS

CROSS-REFERENCE TO RELATED APPLICATIONS

None

STATEMENT REGARDING FEDERALLY SPONSORED RESEARCH OR DEVELOPMENT

Not applicable.

REFERENCE TO A MICROFICHE APPENDIX

Not applicable.

BACKGROUND

Bootstrapping, or booting, is the process of starting up any computer. One of the functions performed during this process is the detection of data-storage units that are available to the computer. Several operating systems assume that any data-storage unit that is accessible during the booting process should be made accessible to users, and, if necessary, automatically configured for their use.

While the process of booting is intended to be helpful to the user by making data-storage units available to the user, a common problem is for one operating system to make changes to a data-storage unit that corrupts data stored on that data-storage unit by another operating system connected to the same network. For example, Windows servers attached to a storage a real network (SAN) attempt to write Windows volume labels to the SAN device, which will, under certain conditions, corrupt the volume when accessed by a Linux server.

SUMMARY

One of the embodiments disclosed is of an access masking structure, which comprises a mode selection mechanism, a processor operably connected to the mode selection mechanism, and computer code located on computer readable medium accessed by the processor to automatically configure access restrictions based on enabled storage units and enabled computers on a network.

In another embodiment, a method of configuring an access masking structure to configure allowed access among a plurality of computers and a plurality of access storage units in a network is disclosed which comprises selecting at least one computer to participate in an access restriction set, selecting at least one storage unit to participate in the access restriction set, disabling all non-selected computers, disabling all non-selected storage units and placing the access masking structure into team mode. This method also comprises booting the selected computers, detecting activity between the selected computers and the selected storage units, and automatically building the access restriction set based upon the detected computers and storage units while the access masking structure is in the team mode.

In yet another embodiment, a method of configuring an access masking structure is disclosed which comprises connecting a first storage unit and a second storage unit to the access masking structure, connecting a computer to the access masking structure, disabling the second storage unit with respect to the access masking structure and placing the access masking structure into a learn mode. This method also comprises bootstrapping the computer, automatically programming the access masking structure to allow network communication between the computer and the first storage unit, placing the access masking structure a normal mode, enabling the second storage unit, and allowing network access through the access masking structure the computer and the first network storage unit. This method also blocks network access through the access masking structure between the computer and the second storage unit.

These and other features and advantages; will be more clearly understood from the following detailed description taken in conjunction with the accompanying drawings and claims.

BRIEF DESCRIPTION OF THE DRAWINGS

For a more complete understanding of the present disclosure and the advantages thereof reference is now made to the following brief description, taken in connection with the accompanying drawings and detailed description, wherein like reference numerals represent like parts.

DETAILED DESCRIPTION OF THE PREFERRED EMBODIMENTS

Figure 1:
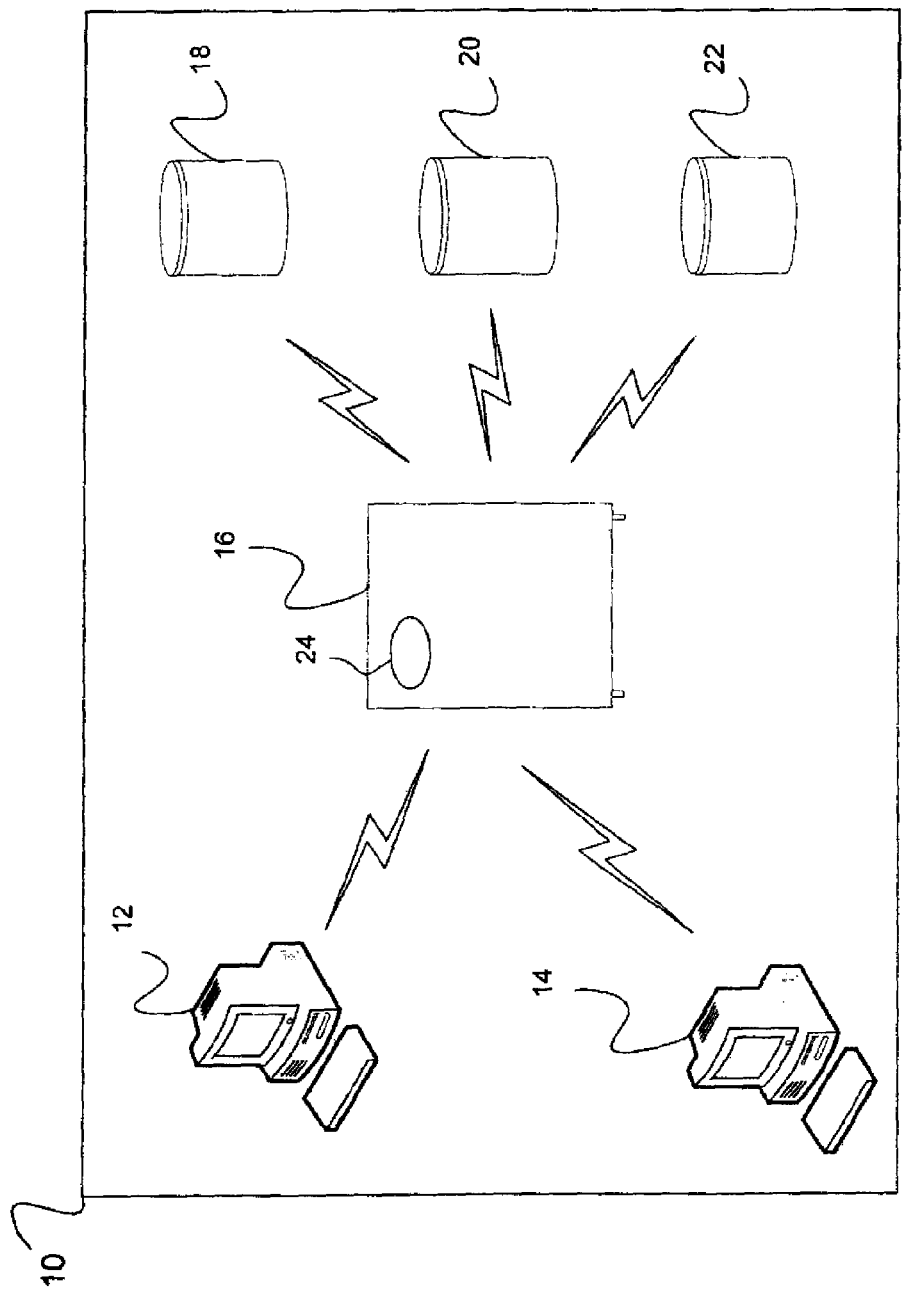
FIG. 1 illustrates one embodiment of the present disclosure.

It should be understood at the outset that although an exemplary implementation of several embodiments of the present disclosure are illustrated below, the present system may be implemented using any number of techniques, whether currently known or in existence. The present disclosure should in no way be limited to the exemplary implementations, drawings, and techniques illustrated below, including the exemplary design and implementation illustrated and described herein, but may be modified within the scope of the appended claims along with their full scope of equivalents.

The present disclosure, in some preferred embodiments, teaches systems and methods for configuring access of a computer or other user network access devices to communicate and access one or more storage units, through an access masking structure (AMS). The network may be any kind of computer network capable of communicating data, and the computer may be any kind of electronic device capable of communicating with a storage unit including, but not limited to, a personal computer, client computer, and/or server computer, (each of which may be referred to as simply a "computer"). The storage unit may be any kind of mass storage unit, including, but not limited to, a hard disk, such as one which uses the small computer system interface (SCSI), a solid state semiconductor based memory device, or any other type of data storage unit. In some embodiments the access masking structure is connected in between a computer and a storage unit as part of a networking technology such as serial attached SCSI (SAS), fibre channel, and transmission control protocol/internet protocol (TCP/IP) networks (such as but not limited to the Internet). The access masking structure typically is capable of implementing at least one access masking technology including, but not limited to, fibre channel zoning, fibre channel logical unit number (LUN) masking, SAS zoning, and SCSI Access controls. The disclosed systems and methods for configuring the access masking structure rely primarily (but not solely) on manual manipulation of the components to physically establish a desired configuration containing one computing device and one or more storage units, cause the access patterns between computing devices and storage units in the desired configuration to be retained by access masking components in the configuration that are operating in a 'Learn' mode, and cause the retained configurations of computing devices and storage units to be enforced by the access masking components running in 'Normal' mode even when accesses are attempted which would have been physically impossible in the manually desired configurations. The terms 'Normal' mode, 'Run' mode, 'Normal operation' mode are intended to refer to the same mode of operation. The access masking structure typically comprises hardware components on which at least a portion of the computer code implementing the access masking structure runs which may include, but are not limited to, a storage device, a router, a computer acting as a server, a plurality of computers acting as a server, a server and at least one of the enabled computers, a server and at least one of the enabled storage units, or a selection of the enabled computers or the selected storage units without an independent server. In some embodiments, the software of the access masking structure may be executed within a single hardware component, or distributed and executed among several hardware components which may include hardware independent of and communicatively in between the computers and storage units, distributed activity on the computers and storage units themselves, or a combination of both. The access masking unit may be implemented in hardware which includes, but is not limited to, at least one network capable device. It is contemplated that two or more network devices could also function as a single access masking unit.

The connections between the access masking structure, storage unit, and computer may be made using network technologies such as Fibre channel. Ethernet, wireless network, or any other technology which is capable of storage area network connectivity, including, but not limited to serial attached SCSI. For the purposes of this disclosure, these technologies are referred to collectively or individually as 'the network' or 'a network'. The term network also includes other network technologies, including, but not limited to, encapsulated security payload extensions and Internet protocol suites, such as the Internet key exchange for Internet protocol security.

It is envisioned that in some embodiments, networking security schemes including, but not limited to, switch link authentication protocol (SLAP), fibre channel authentication protocol (FLAP), and fibre channel password authentication protocol (FCPAP), may be used in conjunction with the present disclosure. The access masking structure may, in some embodiments, be configured through a mechanical switch located on the access masking structure device. This mechanical switch may, in some embodiments, place the access masking structure device in Learn or Run mode, and (in Learn mode) allow for automated network configuration, when the access masking structure device is in the Learn mode.

A storage unit can be used to give an OS block-level access to a remote device on the same network. Depending on the types of devices supported by the storage unit, this block-level access can be used to build volumes, logical units, and redundant arrays of inexpensive disks (RAID) volumes using remote disks 7 or to connect and use remote DVD/CD-writers, or to simply access additional storage space.

FIG. 1 is one exemplary example of a network 10 in which a first computer 12 and a second computer 14 are connected to network hardware 16. Network hardware 16 contains access masking structure 24 and is further connected to a first storage unit 18, a second storage unit 20, and a third storage Unit 22. Network hardware 16 may be implemented as any mechanism capable of relaying network data, including, but not limited to, a network router. In this embodiment; access masking structure 24 controls the access masking functions of the network hardware 16 and is capable of configuring network access between the first storage unit 18, second storage unit 20, third storage unit 22, first computer router 14 using one or more of the systems and methods described and/or referenced by the present disclosure. It should be expressly understood that the present application should not be limited to the technologies listed within the application, as the systems and methods disclosed may be applied to any networking and storage technology known to one skilled in the art.

Figure 2:
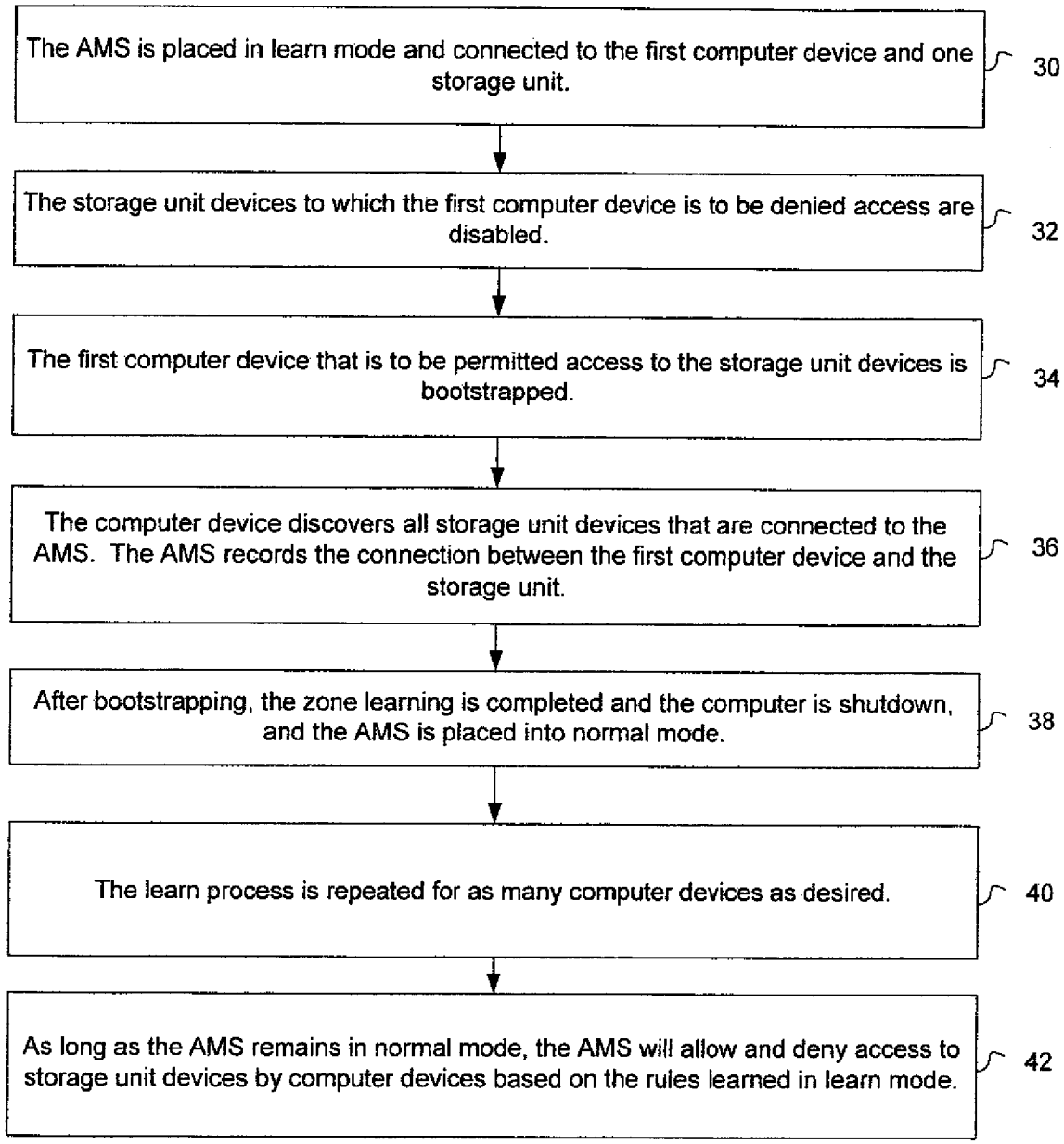
FIG. 2 is a flowchart illustrating one embodiment one the present disclosure.

FIG. 2 is a flowchart of one embodiment of the present disclosure, where one of the techniques known as SAS zoning or fibre channel zoning is implemented by the access masking structure 24. Zoning refers to the process by which a network is divided up into numerous 'virtual' networks, herein referred to as zones, wherein the access to any particular network resource is determined by the zone the computers and storage units are part of. While one embodiment is illustrated here for implementing an access masking structure implementing SAS zoning or fibre channel zoning, other embodiments may also be used to implement these zoning approaches. In the current embodiment, it is desired that the first computer 12 be connected to the first storage unit 18 through network hardware 16. To accomplish this, access masking structure 24, which in this embodiment is integrated into network hardware 16, is placed in Learn mode and connected to at the first computer 12 and the first storage unit 18 (Block 30). The Learn option may be implemented as a mechanical device such as a switch or button located on access masking structure 24 or the network hardware 16 that contains the access masking structure. The shift into Learn mode and in some embodiments the instruction to create a zone representing the current configuration may be given to access masking structure 24 by pressing the mechanical switch or button. The storage units, such as second storage unit 20, to which the first computer 12 is to be denied access, are disabled with respect to the configuration by any number of methods (Block 32).

Storage units may be disabled in several different ways, including, but not limited to, hardware disconnection, power deactivation, and software disabling which render a storage unit non-responsive to inquiries from one or more operating systems or computers. Hardware disconnection is intended to include any method, including, but not limited to, the removal of a physical network connection (e.g., wired ethernet connection), physically removing the storage unit from the configuration (e.g., sliding a magnetic disk drive out of a Just A Bunch Of Disks (JBOD) slot), or a switch, knob, or similar mechanical devices located on the individual components (e.g., on the magnetic disk or tape device) which prevents communication between the storage unit or computer with the network. Power deactivation includes any method by which a computer or storage unit is powered down including the removal of an electrical connection the computer or storage unit, turning the device to an 'off' state, or otherwise impeding electrical flow to the computer or storage unit. Software disabling includes configuration changes which may be made through methods which include, but are not limited to, the sending of messages from a computer to one or more storage units, one or more access masking structures, or to one or more other computers via the data-transfer components. The sent messages typically disable the storage unit or computer through methods which include providing instructions which directly disable the unit itself or indirectly disable it by disabling communications to the storage unit. It is understood that any approach which blocks outbound communications to the storage unit, blocks the ability of the unit to recognize the communications, blocks the ability of the unit to respond to communications, or blocks inbound communications from the unit is contemplated. Computers may be disabled in the same general categories in analogous manners as understood by one of skill in the art.

Access masking structure 24 is placed into Learn mode in which it is instructed to create a zone that represents the current configuration. This instruction may be given to access masking structure 24 by pressing a switch, knob, or similar mechanical devices located on the located on any one of the components in access masking structure 24 or the network hardware 16 that contains the access masking structure. First computer 12 that is to be permitted access to first storage unit 18 is bootstrapped (Block 34). The first computer 12 discovers all storage units that are connected to the network 16 whose access masking functions, if any, are managed by the access masking structure 24. Any number of computers or storage units may be made part of this process. While it is preferable that the all storage units are first activated prior to any computer being bootstrapped, this is not a requirement in all embodiments.

Access masking structure 24 records the connection between the first computer 12 and to the first storage unit 18 (Block 36). Access masking structure 24 then designates this connection, and any other connections between any computers and storage units, as a zone. If another storage unit, such as second storage unit 14 had been active during the bootstrapping and first computer 12 had detected second storage unit 14, then access masking structure 24 would have automatically added this device to the zone. Access masking structure 24 is then placed into Normal operation (Block 38) and each computer is bootstrapped. While it is preferable that the first computer be restarted after access masking structure 24 teaming is complete, and access masking structure 24 is switched to Normal mode, it is envisioned that in some embodiments that this may not be necessary. After the access masking structure 24 is switched to Normal mode, each computer is limited to accessing the storage units that were recorded within the created zone while the access masking structure 24 was in Learn mode. It should be noted that any number of zones may be created by this process.

The Learn process is repeated for as many combinations of computers and storage units as desired (Block 40). The Learn process may be repeated for any given computer whenever access to additional storage units or different combinations of storage units needs to be learned. The Learn process may be repeated at any time. (e.g., if a new computer is acquired after months of Normal operation, the Learn process may be repeated in order to configure the new computer). When the Learn process is completed, as long as access masking structure 24 remains in Normal mode, access masking structure 24 will allow and deny access to storage units by computers based on the rules learned in Learn mode (Block 42). While in Normal mode, access masking structure 24 will block all access between storage units and computers not permitted by the rules learned in Learn mode.

Figure 3:
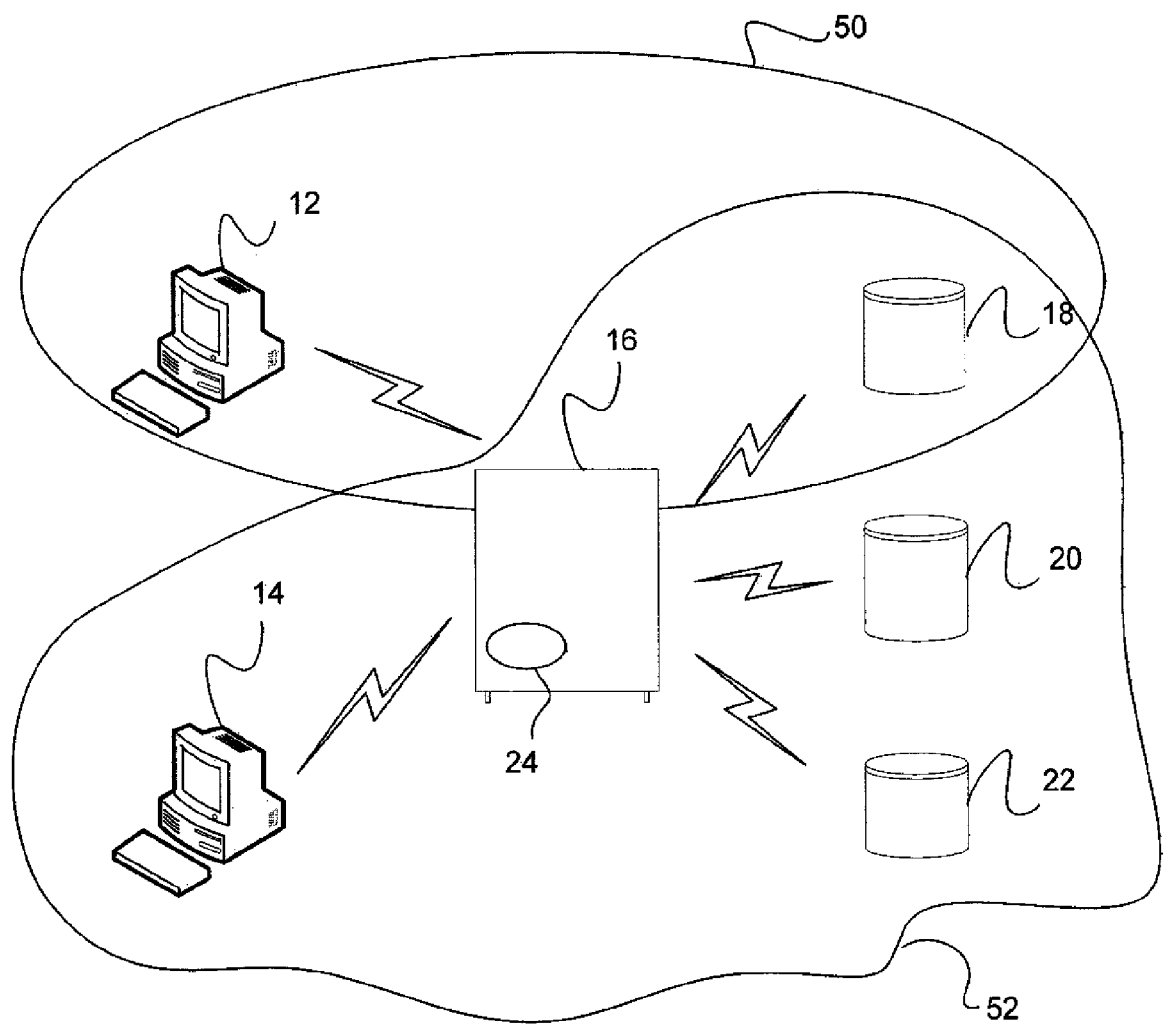
FIG. 3 illustrates one embodiment of the present disclosure where multiple access zones are created.
Figure 4:
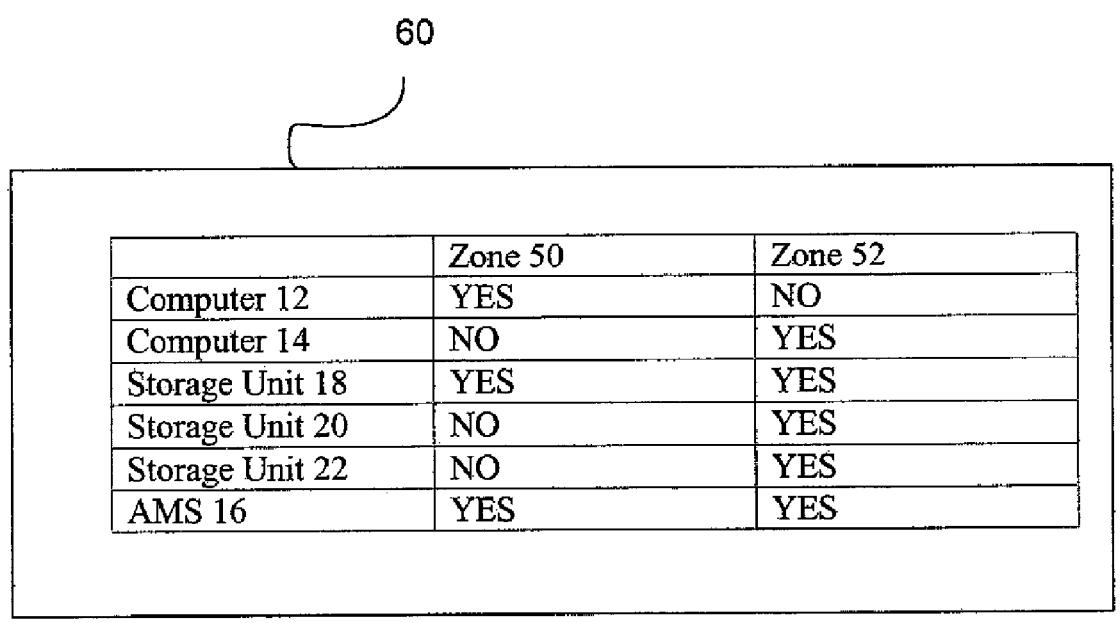
FIG. 4 is an example of a table that is generated from one embodiment of the present disclosure.

The disclosed system and method provide for learned zones to be static during Normal operation. FIG. 3 is an example of where multiple zones may exist. Zone 50 contains first computer 12, network hardware 16, access masking structure 24, and first storage unit 18. Zone 52 contains second computer 14, network hardware 16, access masking structure 24, first storage unit 18, second storage unit 20, and third storage unit 22. In this example, first computer 12 is able to access first storage unit 18, but is not able to access second storage unit 20 or third storage unit 22. In contrast, second computer 14 is able to access first storage unit 18, second storage unit 20, and third storage unit 22. This example is given for illustrative reasons only, as it is envisioned that in other embodiments any number of other configurations may be present. FIG. 4 is an example of a table 60 that could be generated from the zones shown in FIG. 3, with "YES" indicating that communication is permitted and "NO" indicating that communication is not permitted.

Figure 5:
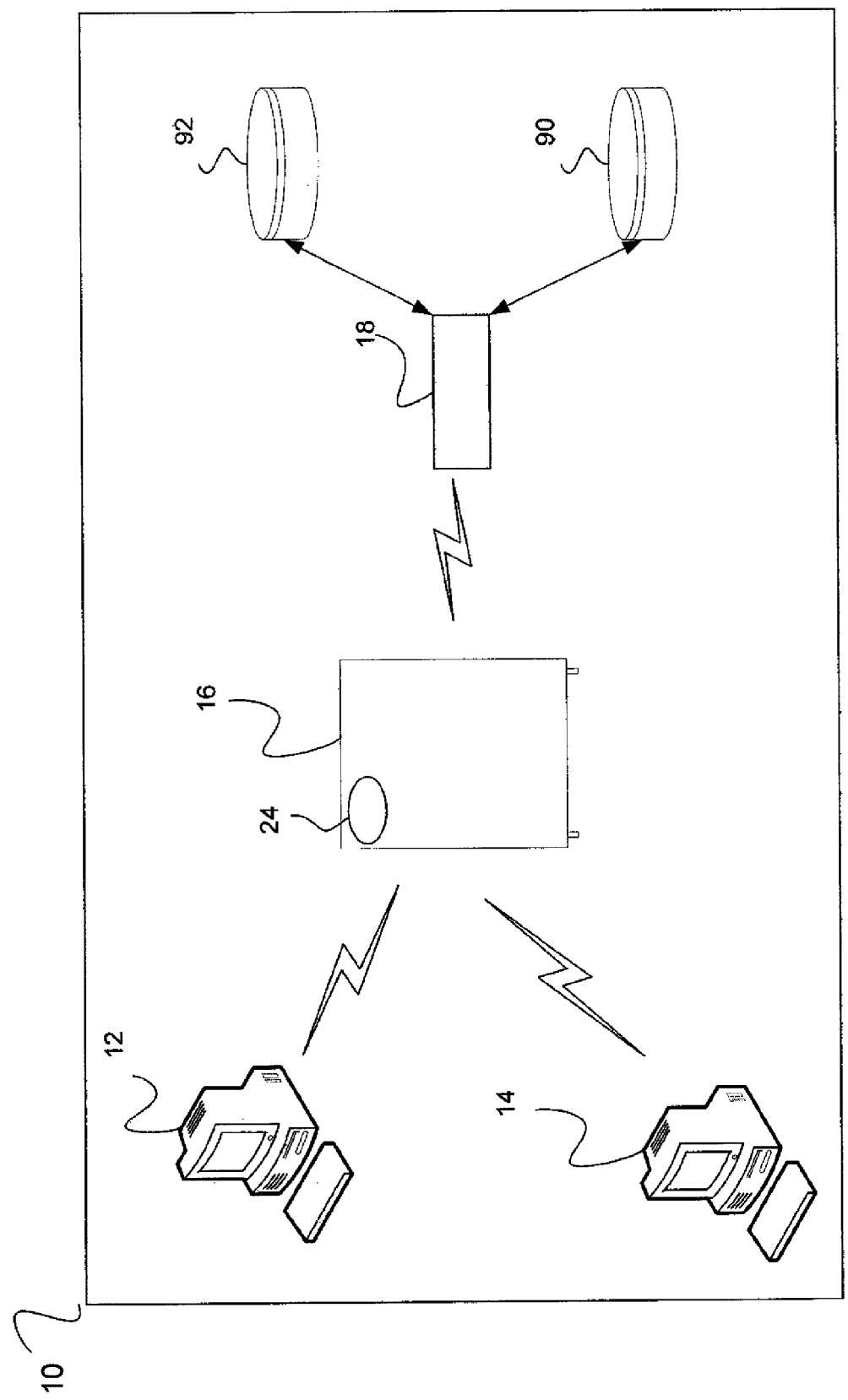
FIG. 5 illustrates one embodiment of the present disclosure using LUN masking.

Another method of implementing the access masking structure may be found using the LUN masking scheme. LUN masking refers to an access masking process that makes a LUN available to some computers and unavailable to other computers. LUN masking is similar to zoning except that zoning masks accesses to storage units whereas LUN masking does the same thing with respect to LUNs. FIG. 5 is an exemplary example of a network 10 in which a first computer 12 and a second computer 14 are connected to network hardware 16. Network hardware 16 contains access masking structure 24 and is further connected to a first storage unit 18, which contains a first LUN volume 90 and a second LUN volume 92. Network hardware 16 may be implemented as any mechanism capable of relaying network data, including, but not limited to, a network router. Access masking structure 24 is capable of configuring network access between the first storage unit 18, first computer 12 and second computer 14 using one or more of the systems and methods described and/or referenced by the present disclosure.

Figure 6:
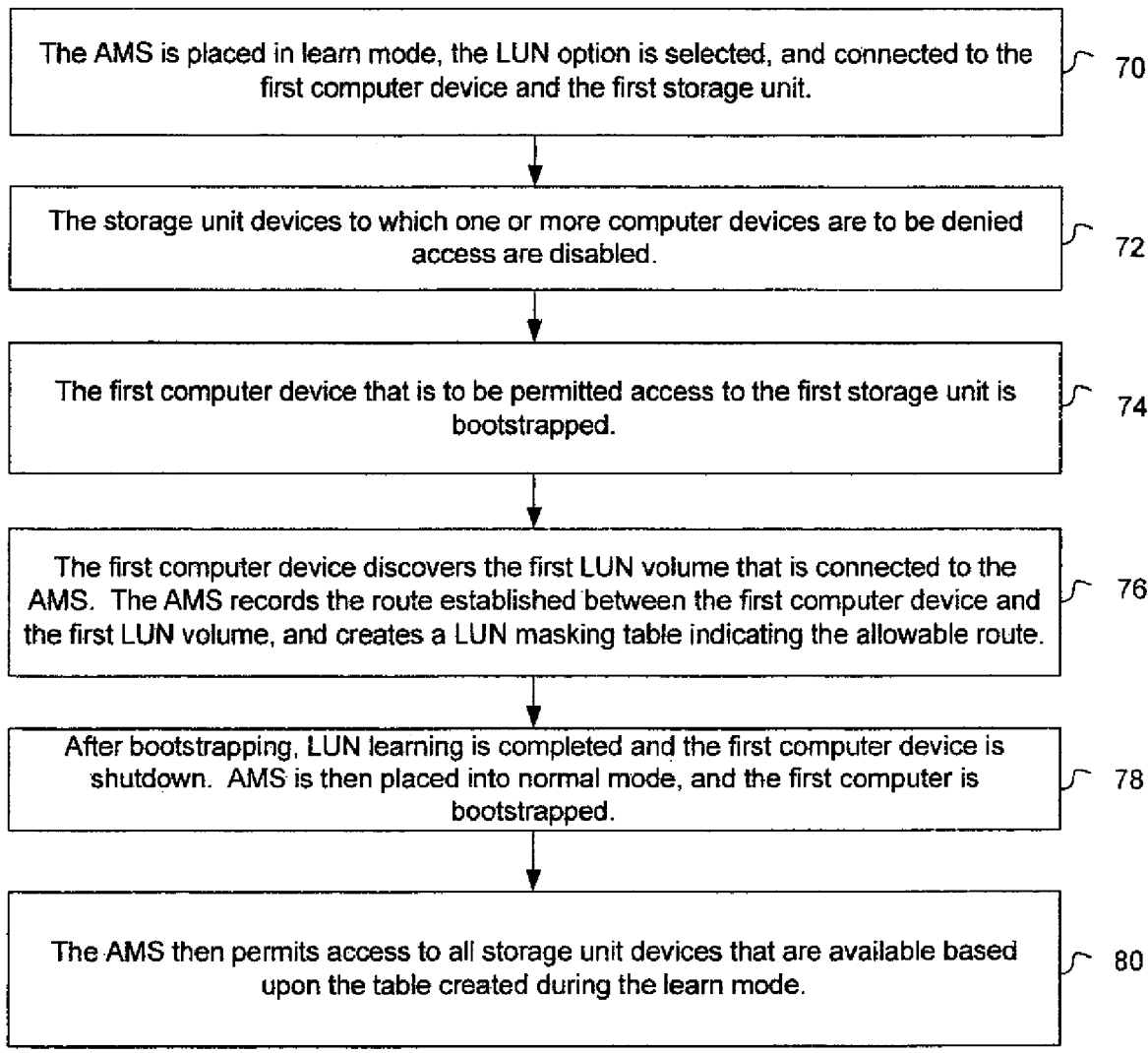
FIG. 6 is a flowchart illustrating one embodiment one the present disclosure.

FIG. 6 is a flowchart of one embodiment of the present disclosure using the LUN masking scheme, where the first computer 12 is connected to a first storage unit 18 through an access masking structure 24. Access masking structure 24 is placed in Learn mode and, in some embodiments having a specific LUN option, the LUN option is selected, and connected to at least one computer and one storage unit which has at least one LUN volume (Block 70). It should be understood that access masking structure 24 may be embodied as a LUN only device, and in this case the LUN option may be replaced by a Learn option. The storage units, such as a second LUN Volume 92, to which the first computer 12 is to be denied access, are manually removed from the configuration (Block 72). The removal of the second LUN Volume 92 to which the first computer 12 is to be denied access may be accomplished by disabling the LUN Volume. The disabling of the LUN volume to which the first computer 12 is to be denied access may be accomplished any number of methods including those methods of disabling described above.

Figure 7:
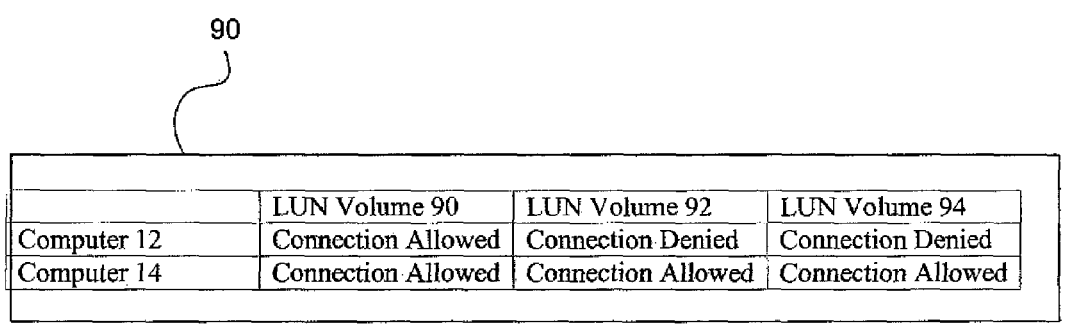
FIG. 7 is an example of a table that is generated from one embodiment of the present disclosure.

The first computer 12 that is to be permitted access to the first LUN Volume 90 is bootstrapped (Block 74). First computer 12 discovers the first LUN Volume 90 that is connected to the network 16 whose access masking functions, if any, are managed by the access masking structure 24. Access masking structure 24 records the access established between the first computer 12 and LUN Volume 90 through first storage unit 18, and creates a LUN masking table indicating the allowable access (Block 76). After bootstrapping, LUN learning is completed and the first computer 12 is shutdown. Access masking structure 24 is then placed into Normal mode, and first computer 12 is bootstrapped (Block 78). While it is preferable that the first computer be restarted after access masking structure 24 learning is complete, and access masking structure 24 is switched to Normal mode, it is envisioned that in some embodiments that this may not be necessary. The access masking structure then permits access to all LUN volumes found in storage units that are available based upon the table created during the Learn mode (Block 80). The Learn mode may be repeated for as many computers as are available to network hardware 16 that contains the access masking structure 24. FIG. 7 is an example of a table 90 that could be generated from the LUN masking.

In some embodiments, the access masking structure when using either the zoning or LUN masking scheme may be based upon the policy of minimal access required. In this way, all computers are, in the absence of being part of a particular zone in the case of the zoning scheme, or specifically allowed in the case of the LUN masking scheme, denied access to all network accessible storage units and/or LUNs. It is envisioned that this scheme could be modified to allow for other access schemes, such as a scheme to allow shared resource to all storage units and/or LUNs even in the absence of specific authorization.

Another technology whereby the disclosed systems and methods may be used is through the use of Access Controls which are a SCSI-defined capability that any storage unit may implement Although it is not the only embodiment of relevance to this disclosure, the SCSI Access Controls technology is commonly implemented by iSCSI storage units. iSCSI is an Internet protocol (IP) based storage networking standard which defines storage units that are capable of being linked to computers via a TCP/IP network. SCSI Access controls are explained more fully in the SCSI Standard SPC-3, American National Standards Institute International Committee for Information Technology Standards 408-2005, which is hereby incorporated by reference. In the most common implementation of iSCSI, SCSI commands are sent over standard TCP/IP networks. Examples of TCP/IP networks include; but are not limited to closed Intranets based upon a TCP/IP scheme, the internet, and mixed intranet internet environments, such as the Internet. Because of the ubiquitous use of TCP/IP networking technology, iSCSI can be used to transit data over local area networks (LANs), wide area networks (WANs), or the internet.

Figure 8:
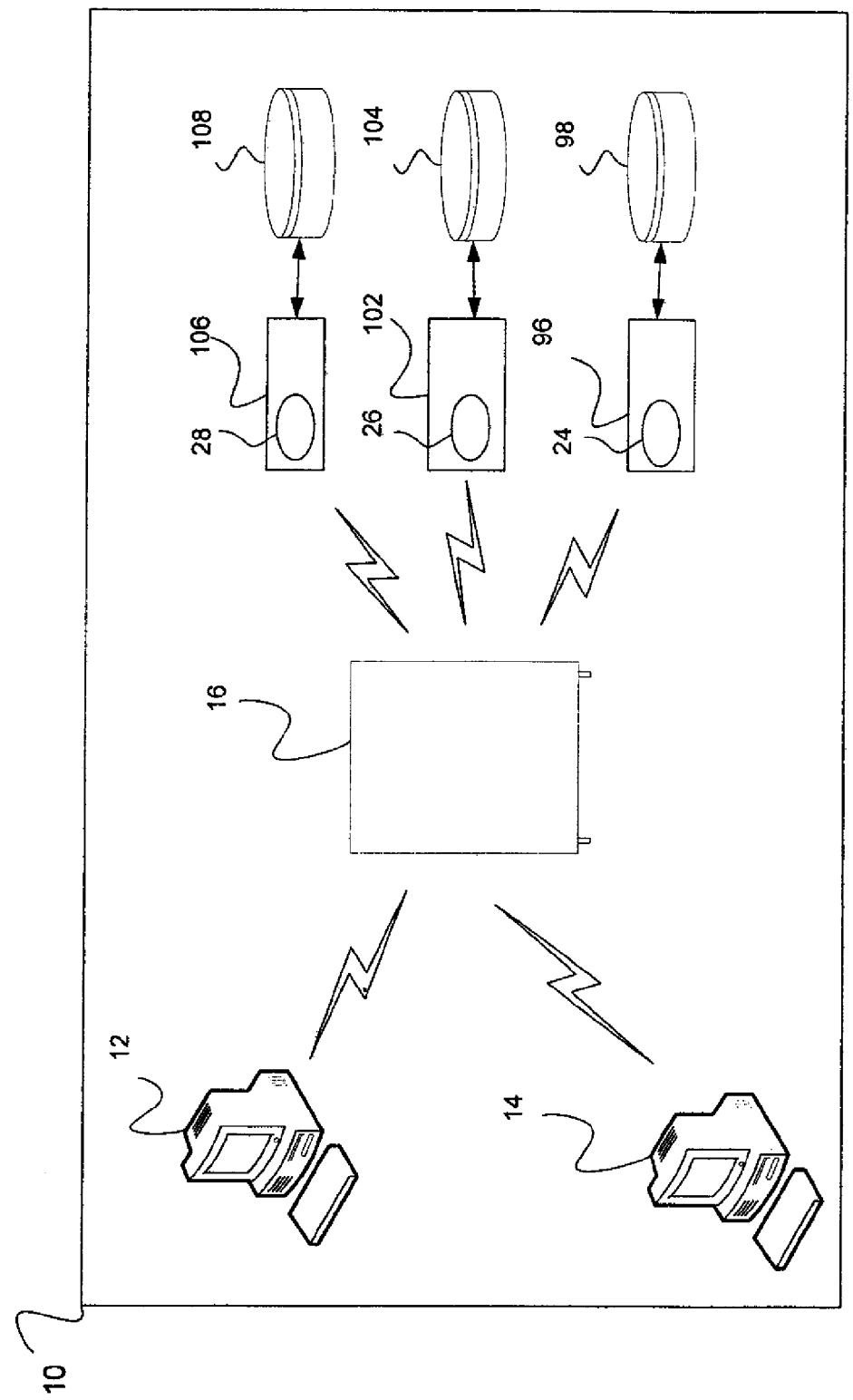
FIG. 8 illustrates one embodiment of the present disclosure.

One of the problems encountered with iSCSI is the difficulty and complexity in configuring access to resources through the ubiquitous TCP/IP network. FIG. 8 is an illustration of an embodiment of network 10 where a first computer 12, second computer 14 are connected to network hardware 16. First storage unit 96 connected to first volume 98 contains first access masking structure 24 and is also connected to network hardware 16. First access masking structure 24 controls access to first volume 98. Second mass storage unit 102 connected to second volume 104 contains second access masking structure 26 and is also connected to network hardware 16. Second access masking structure 26 controls access to second volume 104. Third mass storage unit 106 connected to third volume 108 contains third access masking structure 28 and is also connected to network hardware 16. Third access masking structure 24 controls access to third volume 108. Each storage unit contains an access masking structure. In the embodiment shown in FIG. 8, first access masking structure 24, second access masking structure 26, and third access masking structure 28 directly controls first mass storage unit 96, second mass storage unit 102, and third mass storage unit 106, respectively.

Figure 9:
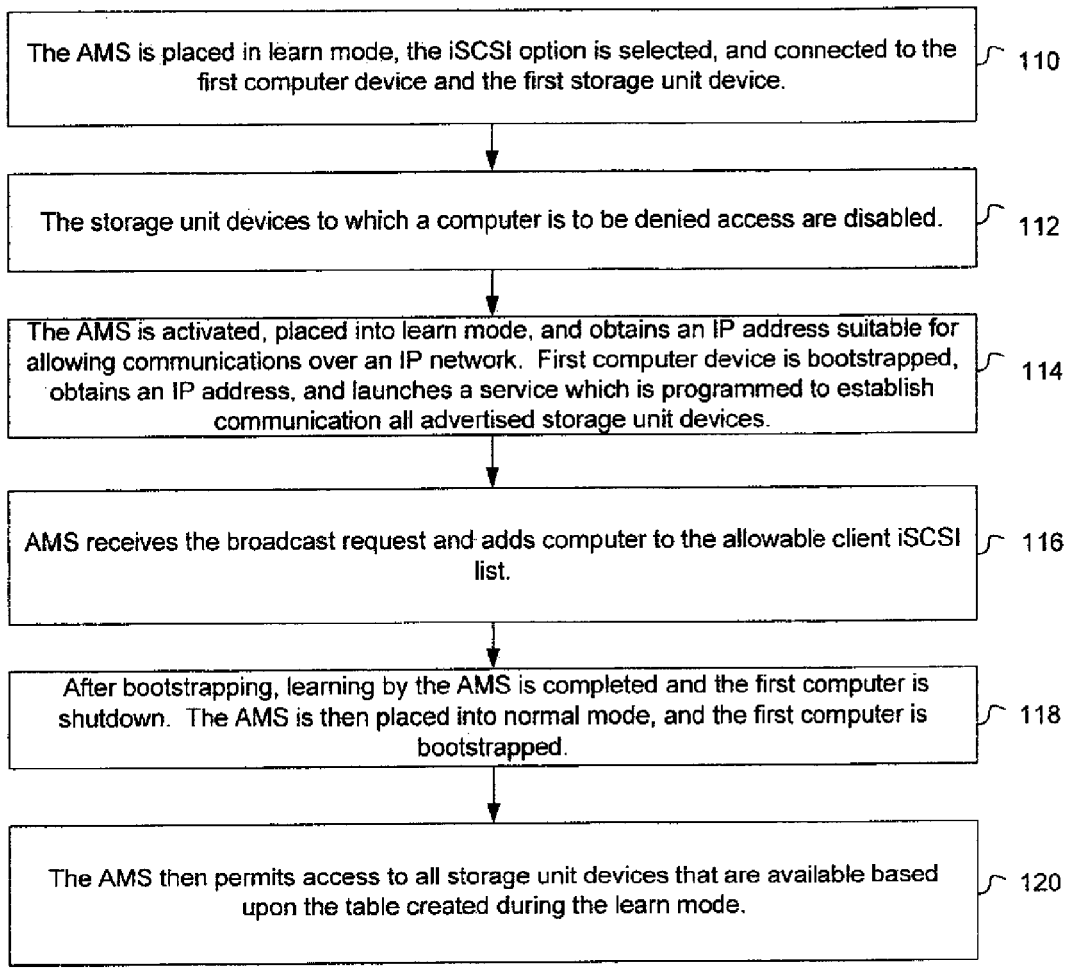
FIG. 9 is a flowchart illustrating one embodiment one the present disclosure.

FIG. 9 is a flowchart of the use of the access masking structure for the example iSCSI configuration shown in FIG. 8. Access masking structure 24 representing storage unit 18 is connected to the network which is in turn connected first computer 12. The access masking structure 24 representing storage unit 18 is placed in Learn mode (Block 110) and, in some embodiments having a specific iSCSI option, the iSCSI option is selected. It should be noted that if the access masking structure is limited to the iSCSI embodiment, the iSCSI option may be replaced by the Learn option. The Learn option may be implemented as a mechanical switch or button located on access masking structure 24. The storage units to which the first computer 12 is to be denied access are disabled from the configuration or not placed in Learn mode (Block 112). The disabling of the storage units to which the first computer 12 is to be denied access may be accomplished any number of methods, including those methods of disabling described above.

Figure 10:
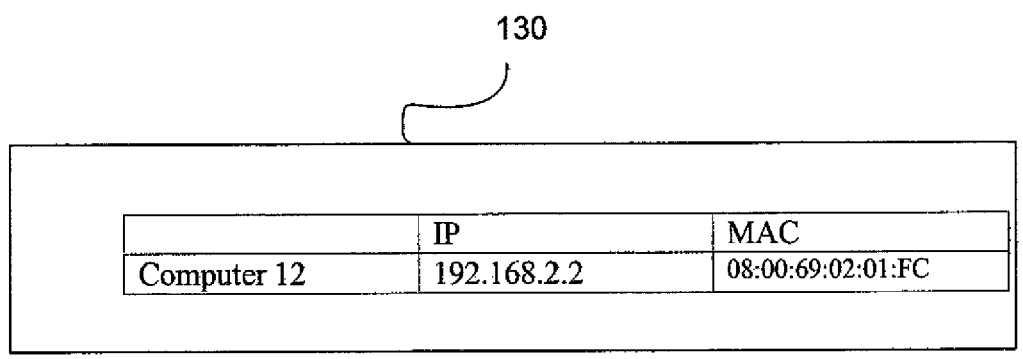
FIG. 10 is an example of a table that is generated from one embodiment of the present disclosure.

FIG. 9 also shows that the first computer is bootstrapped and establishes communications with all advertised storage units. The access masking structure detects the established communications link, adds computer 12 to the allowable client iSCSI list, and records suitable TCP/IP addressing information for allowing future communications with the first computer (Block 114). After bootstrapping, the learning is completed and the first computer 12 is shutdown. Access masking structure 24 is placed into normal mode, and the first computer 12 is bootstrapped (Block 118). While it is preferable that the first computer 12 be restarted after access masking structure 24 learning is complete, and access masking structure 24 is switched to Normal mode, it is envisioned that in some embodiments that this may not be necessary. The access masking structure then permits access to all storage units that are available based upon the table created during the Learn mode (Block 120) but not to any other computers. FIG. 10 is an example of a table 130 that could be generated by an iSCSI access masking structure learning suitable TCP/IP addressing information for allowing future communications with computers, illustrating the IP and media access control (MAC) address of computer 12 is allowed access to storage unit 18. It is envisioned that in a LAN environment, the distributed name server (DNS) or equivalent means could be used to identify network paths suitable for communications between the first computer 12 and the first storage unit 18.

In some embodiments, the access masking structures communicate in such a manner that the shifting of one of the network connected access masking structures into learn mode shifts all of the networked connected access masking structures into learn mode or all of a defined group of such structures into learn mode. In other embodiments, each access masking structure must be individually shifted into learn mode for training for a given instance.

Figure 11:
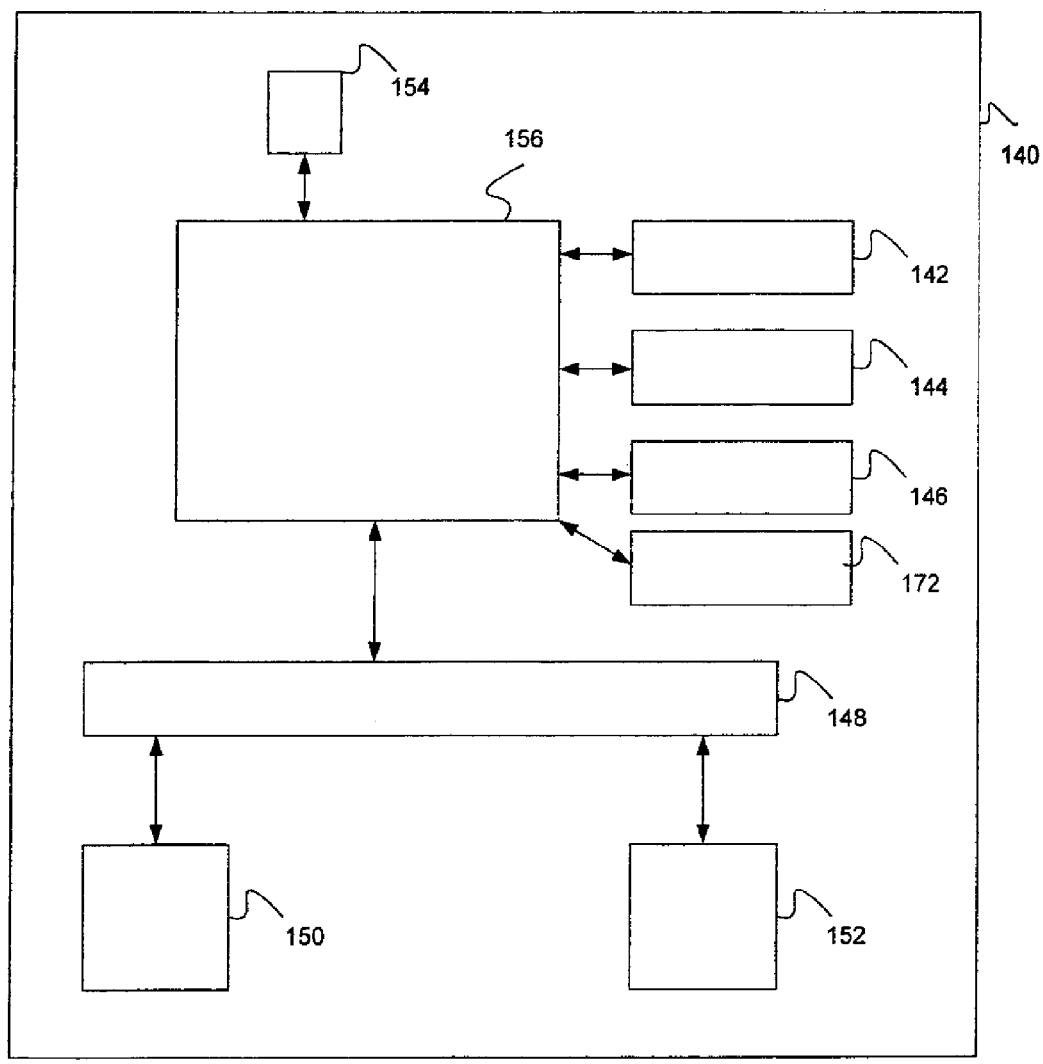
FIG. 11 illustrates an exemplary storage area network router system suitable for implementing the several embodiments of the disclosure.

The system described above of the access masking structure may be implemented on any general-purpose computer with sufficient processing power, memory resources, and network throughput capability to handle the necessary storage area networking workload placed upon it. FIG. 11 illustrates a typical, storage area network router (or hub) system suitable for implementing one or more embodiments disclosed herein. The system 140 includes a processor 156 (which may be referred to as a central processor unit or CPU) that is in communication with memory devices including stable storage 144, read only memory (ROM) 142, random access memory (RAM) 146, other optional input/output (I/O) 172 devices, and network connectivity devices 148, 150, and 152. The processor may be implemented as one or more CPU chips.

When the mode-selection switch 154 is set in the Run position, the access masking structure enforcement of retained configuration information occurs, in some embodiments, based on permission statements as described in multiple previous patents, for instance, U.S. Pat. No. 6,765,919 which is hereby incorporated by reference. Access masking structure enforcement operations are envisioned as (but not limited to) hardware-based enforcement performed by a network data transfer interface 150 or 152, or a network routing crossbar 148, as well as software-based enforcement performed by the processor 156 under program control. All enforcement is supervised (but not necessarily performed) by the processor 156 based on programs and data stored in the read-only memory (ROM) 142, stable storage 144, and random-access memory (RAM) 146.

One of the innovative elements of the present disclosure is that the permission statements are generated automatically by the access masking structure when the mode-selection switch 154 is set in the Learn position using information about the accesses which happen during bootstrapping in a physically modified configuration. No human interaction (other than physically modifying the configuration) is needed in order to generate the permission statements.

The processor 156 executes instructions, codes, computer programs, scripts which it accesses from hard disk, floppy disk, optical disk (these various disk based systems may all be considered stable storage 144), ROM 142, RAM 146, or the network data transfer interface 150.

Optional I/O 172 devices may include printers, video monitors, liquid crystal displays (LCDs), touch screen displays, keyboards, keypads, switches, dials, mice, track balls, voice recognizers, card readers, paper tape readers, or other well-known input devices.

Taken together, the first network data transfer interface 150, second network data transfer interface 152, and network routing crossbar 148 participate in and perform a part of the routing (or hub) function in a storage area network. The preferred storage area network embodiments are serial attached SCSI (SAS) and fibre channel, but TCP/IP storage area networks based on ethernet or other IP networking technologies as well as modems, modem banks, universal serial bus (USB), serial interfaces, token ring, fiber distributed data interface (FDDI), wireless local area network (WLAN), radio transceiver cards such as code division multiple access (CDMA) and/or global system for mobile communications (GSM) radio transceiver, and other well-known network devices are not excluded as possible embodiments. The first network data transfer interface 150 device and second network data transfer interface 152 may enable the processor 156 to communicate with an Internet or one or more intranets.

With such a network connection, it is contemplated that the processor 156 might receive information from the network, or might output information to the network in the course of performing the above-described method steps. Such information, which is often represented as a sequence of instructions to be executed using processor 156, may be received from and outputted to the network, for example, in the form of a computer data signal embodied in a carrier wave. While the first network data transfer interface 150 and second network transfer interface 152 are shown, any number of network data transfer interfaces may be used. It is also understood that the status (e.g., positioning) of mode selection switch 154 may cause processor 156 to transmit instructions over the first network data transfer interface 150 or the second network data transfer interface 152 to other access masking structures to operate in the run or learn mode.

When the mode-selection switch 154 is set in the Learn position, all access attempts are allowed and information about all accesses performed is collected in stable storage 144 and/or RAM 146. The collected access information is envisioned as being translated by specialized software (stored in the ROM 142, stable storage 144, and/or RAM 146) to appear as if a previously defined management interface disclosed in one or more previous patents had generated the permission statements. The permission statements thus generated are retained in the ROM 142, stable storage 144, and/or RAM 146 as the representation of what computers are allowed to access specific storage units, with enforcement of said representations occurring after the mode-selection switch 154 is returned to the Run position;

Stable storage 144 is typically comprised of one or more disk drives or tape drives and is used for non-volatile storage of data and as an over-flow data storage unit if RAM 146 is not large enough to hold all working data. Stable storage 144 may be used to store programs which are loaded into RAM 146 when such programs are selected for execution. The ROM 142 is used to store instructions and: perhaps data which are read during program execution. ROM 142 is a non-volatile memory device which typically has a small memory capacity relative to the larger memory capacity of secondary storage. The RAM 146 is used to store volatile data and perhaps to store instructions. Access to both ROM 142 and RAM 146 is typically faster than to stable storage 144.

Figure 12:
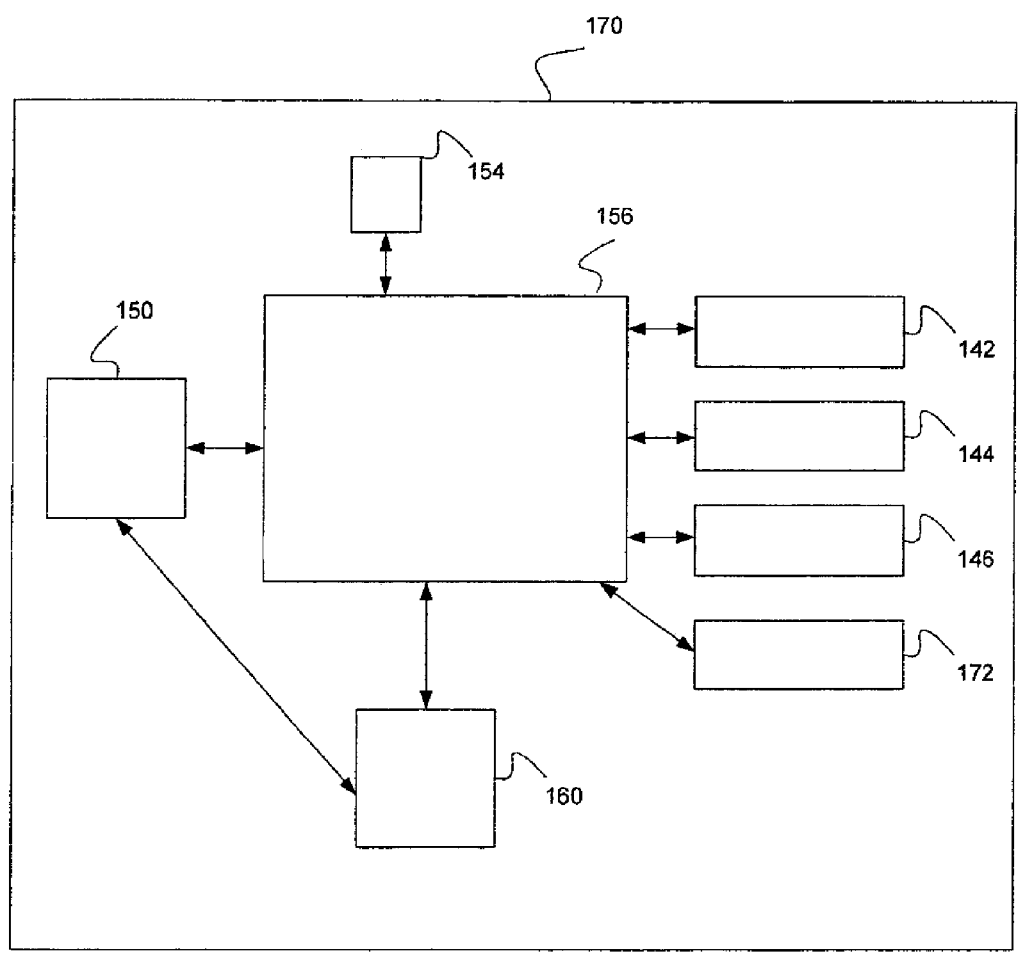
FIG. 12 illustrates an exemplary storage unit processing system suitable for implementing some of the embodiments of the disclosure.

FIG. 12 illustrates a storage unit embodiment 170 wherein a mode-selection switch 154 which is accessible from the processor 156 and affects the execution of programs being run by that processor 156 is shown, and wherein the network data interface 150 is connected to a storage unit transfer interface 160 as described in this disclosure. FIG. 12 has the same operative parts as FIG. 11, except that the network routing crossbar 148 is replaced by a direct connection to the network data interface 150, and a direct storage unit transfer interface 160 allows for communication between the network data transfer interface 150 and the storage unit transfer interface 160, which can be used by some embodiments of the present disclosure. Access masking structure enforcement operations are envisioned as (but not limited to) hardware-based enforcement performed by a network data transfer interface 150, or storage unit transfer interface 160, as well as software-based enforcement performed by the processor 156 under program control.

While several embodiments have been provided in the present disclosure, it should be understood that the disclosed systems and methods may be embodied in many other specific forms without departing from the spirit or scope of the present disclosure, The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Techniques, systems Subsystems and methods described and illustrated in the various embodiments as discrete or separate may be combined or integrated with other systems, modules, techniques, or methods without departing from the scope of the present disclosure. When the term connected is used to refer to the links between devices or components in the network 10, the term is intended to include both direct and indirect connections and any other approach which facilitates communication between the devices. The access masking structure, storage unit, computer, and other items shown or discussed as directly connected or communicating with each other may be connected through some interface or device, such that the items may no longer be considered directly connected to each other but may still be indirectly connected and in communication, whether electrically, wirelessly, mechanically, or otherwise with one another.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. An access masking structure, comprising:
    a mode selection mechanism selectable between a learn mode and an operational mode;
    a processor operably connected to the mode selection mechanism;
    computer code located on a non-transitory computer readable medium accessed by the processor responsive to selection of the learn mode by the mode selection mechanism to automatically configure an access restriction set based upon detected activity between enabled storage units and enabled computers on a network, wherein the access restriction set comprises the enabled storage units and enabled computers and does not comprise computers and storage units that are not enabled on the network during the learning mode; and
    computer code located on a non-transitory computer readable medium accessed by the processor responsive to selection of the operational mode to enforce the access restriction set by blocking access between storage units and computers on the network that are not in the access restriction set.

2. The structure of claim 1, wherein the network carries traffic which includes SCSI commands and responses between computers and storage units.

3. The structure of claim 1, wherein the network technology and access masking structure used is selected from the group of: Fibre Channel with Zoning, Fibre Channel with LUN Masking, Fibre Channel with SCSI Access Controls, SAS with Zoning, SAS with SCSI Access Controls, and TCP/IP with SCSI Access Controls.

4. The structure of claim 1, wherein the access masking structure further comprises an apparatus for disconnecting network or storage unit connections to the structure.

5. The structure of claim 1, wherein the mode selection mechanism may be is a switch, knob, or similar mechanical device located on the access masking structure.

6. The structure of claim 1, wherein the access masking structure further comprises computer code located on a non-transitory computer readable medium accessed by the processor to send and receive messages to a second access masking structure through the network.

7. The structure of claim 6, wherein the first access masking structure may place the second access masking structure into learn or run mode.

8. The structure of claim 1, wherein at least one element of the access masking structure comprises hardware on which at least a portion of the computer code runs, wherein the hardware is selected from the group consisting of: a storage device, a router, a computer acting as a server, a plurality of computers acting as a server, a server and at least one of the enabled computers, a server and at least one of the enabled storage units, or a selection of the enabled computers or the selected storage units without an independent server.

9. A method of configuring an access masking structure to configure allowed access among a plurality of computers and a plurality of access storage units in a network comprising:
    selecting at least one computer to participate in an access restriction set;
    selecting at least one storage unit to participate in the access restriction set;
    disabling all non-selected computers;
    disabling all non-selected storage units;
    placing the access masking structure into learn mode;
    booting the selected computers;
    detecting activity between the selected computers and the selected storage units; and
    automatically building the access restriction set based upon the detected activity between the selected computers and the selected storage units while the access masking structure is in the learn mode, wherein the access restriction set comprises the selected computers and the selected storage units and does not comprise the disabled non-selected computers and the disabled non-selected storage units.

10. The method of claim 9, further comprising placing the access masking structure in run mode, enabling the selected computers to be permitted access to the selected storage units, and denying the selected computers to be permitted access to the non-selected storage units.

11. The method of claim 9, further comprising:
    placing the access masking structure into the learn mode multiple times while different sets of non-selected computers or non-selected storage units are disabled;
    booting at least one computer;
    creating a plurality of access restriction sets; and
    enforcing the plurality of access restriction sets.

12. The method of claim 9, wherein disabling non-selected computers comprises disabling all computers, disabling non-selected storage units comprises disabling all storage units, and after setting the access masking structure to learn mode enabling the selected storage units and then enabling the selecting computers and booting the selected computers.

13. The method of claim 9, wherein the disabling the storage units is preformed through at least one of the following: physical removal, and power deactivation, or software disabling.

14. The method of claim 9, wherein the network technology and access masking structure used is selected from the group of: Fibre Channel with Zoning, Fibre Channel with LUN Masking, Fibre Channel with SCSI Access Controls, SAS with Zoning, SAS with SCSI Access Controls, and transmission control protocol/internet protocol with SCSI Access Controls.

15. A method of configuring an access masking structure comprising;
- connecting a first storage unit and a second storage unit to the access masking structure;
- connecting a computer to the access masking structure;
- disabling the second storage unit with respect to the access masking structure;
- placing the access masking structure into a learn mode while the second storage unit is disabled;
- bootstrapping the computer while the access masking structure is in the learn mode;
- automatically programming the access masking structure to allow network communication between the computer and the first storage unit while the second storage unit is disabled and while the access masking structure is in the learn mode;
- placing the access masking structure in a normal mode;
- enabling the second storage unit while the access masking structure is in the normal mode;
- allowing network access through the access masking structure the computer and the first network storage unit while the access masking structure is in the normal mode; and
- blocking network access through the access masking structure between the computer and the second storage unit while the access masking structure is in the normal mode.

16. The method of claim 15, further comprising: connecting a second computer to the access masking structure, blocking network access through the access masking structure between the second computer and the first storage unit, and blocking network access through the access masking structure between the second computer and the second storage unit.

17. The method of claim 15, wherein the access masking structure uses a networking technology selected from the group of: fibre channel, serial attached SCSI, or local bus controller.

18. The method of claim 15, wherein the access masking structure permits or denies storage unit access based on the network addressing information associated with each storage unit and the logical unit number information associated with addressed logical units within each storage unit.

19. The method of claim 15, wherein the mechanism for placing the access masking structure in normal mode is a mechanical device.

20. The method of claim 15, wherein the mechanism for placing the access masking structure in learn mode causes one or more access masking structures on a network to operate in run or learn mode.

* * * * *

UNITED STATES PATENT AND TRADEMARK OFFICE
CERTIFICATE OF CORRECTION

PATENT NO. : 7,769,842 B2
APPLICATION NO. : 11/463163
DATED : August 3, 2010
INVENTOR(S) : Ralph O. Weber It is certified that error appears in the above-identified patent and that said Letters Patent is hereby corrected as shown below:

In claim 5, column 12, line 5, please delete the terms "may be" and "similar".

Signed and Sealed this

Fifth Day of October, 2010

David J. Kappos
*Director of the United States Patent and Trademark Office*